US008952594B2

(12) United States Patent
Matsumoto

(10) Patent No.: US 8,952,594 B2
(45) Date of Patent: Feb. 10, 2015

(54) ACTUATOR

(75) Inventor: Tetsuro Matsumoto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 975 days.

(21) Appl. No.: 13/084,042

(22) Filed: Apr. 11, 2011

(65) Prior Publication Data

US 2011/0254497 A1 Oct. 20, 2011

(30) Foreign Application Priority Data

Apr. 14, 2010 (JP) ................................. 2010-093466

(51) Int. Cl.
*H02N 11/00* (2006.01)
*H01L 41/107* (2006.01)
*F03G 7/00* (2006.01)

(52) U.S. Cl.
CPC ..................................... *F03G 7/005* (2013.01)
USPC ...................................... 310/300; 310/316.01

(58) Field of Classification Search
CPC ....... H02N 11/06; H02N 2/042; H02N 2/067; F03G 7/005; H04R 23/00; H01L 41/042
USPC ............................. 310/300, 301, 316.01, 317
See application file for complete search history.

(56) References Cited

U.S. PATENT DOCUMENTS

| 4,977,886 | A | 12/1990 | Takehana et al. |
| 5,268,082 | A | 12/1993 | Oguro et al. |
| 8,278,828 | B1 * | 10/2012 | Rutherford ................ 315/169.3 |
| 8,405,277 | B2 * | 3/2013 | Goyal et al. ................... 310/300 |
| 8,487,505 | B2 * | 7/2013 | Ikushima et al. ............. 310/300 |
| 2003/0164658 | A1 * | 9/2003 | Saraf .............................. 310/317 |
| 2009/0021848 | A1 | 1/2009 | Lee |
| 2010/0079032 | A1 * | 4/2010 | Suzuki .......................... 310/317 |
| 2011/0127880 | A1 * | 6/2011 | Murphy et al. ............... 310/317 |
| 2012/0133243 | A1 * | 5/2012 | Okuzaki et al. .............. 310/300 |
| 2012/0326564 | A1 * | 12/2012 | Takahashi et al. ............ 310/328 |

FOREIGN PATENT DOCUMENTS

| EP | 0 924 033 A2 | 6/1999 |
| JP | A-4-275078 | 9/1992 |
| JP | A-04-340110 | 11/1992 |
| JP | A-11-169393 | 6/1999 |
| JP | A-2006-173219 | 6/2006 |
| JP | A-2009-025818 | 2/2009 |
| JP | A-2009-044951 | 2/2009 |

\* cited by examiner

*Primary Examiner* — Thomas Dougherty
(74) *Attorney, Agent, or Firm* — Oliff PLC

(57) ABSTRACT

An actuator includes an electrolyte membrane, first and second driving electrodes that are disposed on the opposite surfaces and that give a potential difference to the electrolyte membrane, a sensor that is formed on the electrolyte membrane and that detects a force acting on the electrolyte membrane, and a driving control circuit that supplies a drive voltage to the first and second driving electrodes on the basis of an instruction signal and a detection output of the sensor. The driving control circuit applies a PWM drive voltage with a duty ratio corresponding to a difference between the instruction signal and the detection output of the sensor across the first driving electrode and the second driving electrode.

8 Claims, 9 Drawing Sheets

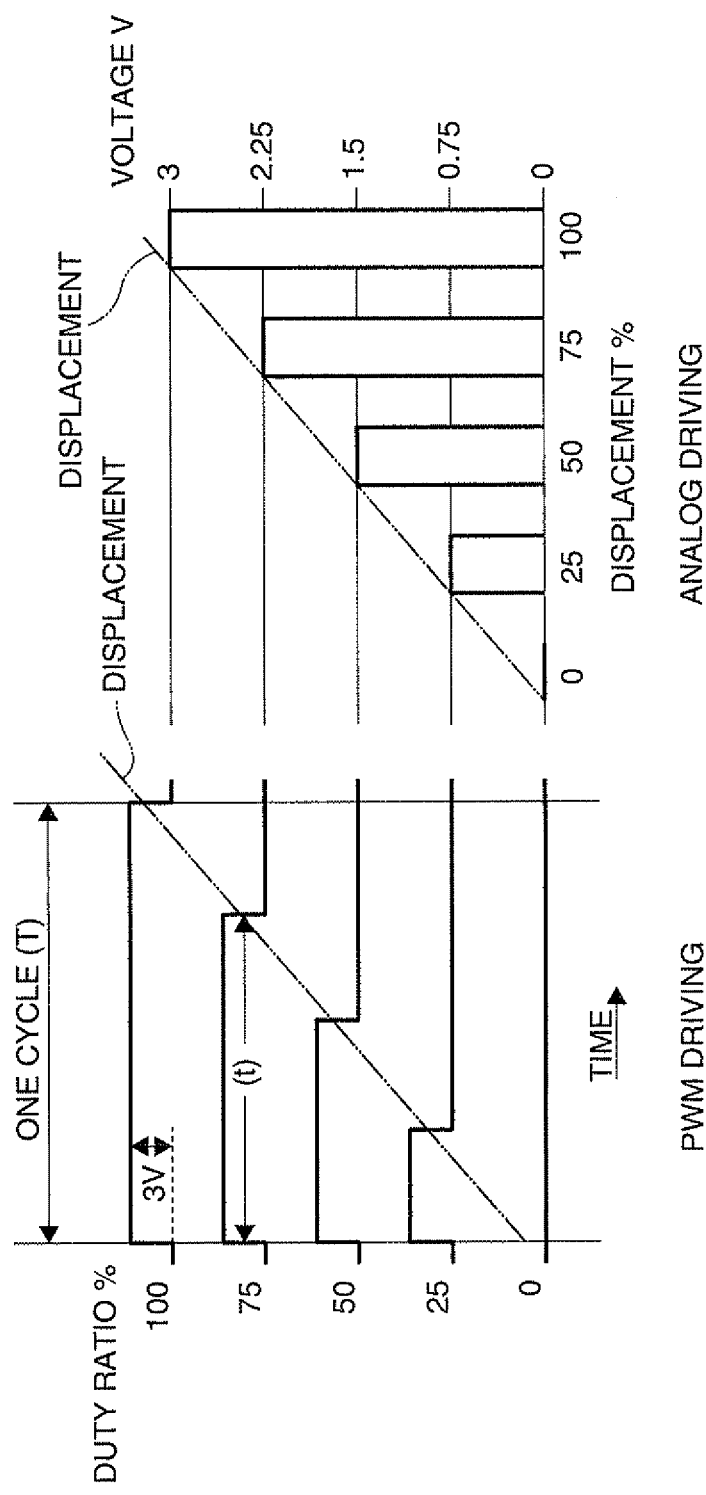
FIG. 10A  PWM DRIVING
FIG. 10B  ANALOG DRIVING

ACTUATOR

The entire disclosure of Japanese Patent Application No. 2010-093466, filed Apr. 14, 2010 is expressly incorporated by reference herein.

BACKGROUND

1. Technical Field

The present invention relates to an actuator, and more particularly, to the configuration of an actuator which can detect a direction of displacement or an amount of displacement.

2. Related Art

A polymer actuator is known as a type of actuator. The actuator is formed of a soft material such as rubber and has a characteristic that it will bend with the application of a voltage and is restored to the original state with the cessation of the voltage application. For example, electrodes are formed on both surfaces of an ion-exchange membrane and a potential difference is given to the ion-exchange membrane to deform the ion-exchange membrane. Examples of a polymer electrolyte-membrane actuator having such a characteristic are described in JP-A-4-275078 and JP-A-11-169393.

However, the polymer actuator generally has a problem in that the response speed is low and the controlling of the displacement is not easy.

The present applicant particularly proposes a polymer actuator which can be made to behave to a desired position by disposing a sensor detecting a potential (potential difference) generated in an electrolyte membrane due to bending in the electrolyte membrane and performing a feedback control operation thereon so as to reduce the size of a structure employing the polymer actuator.

However, the voltage (for example, 2 mV) detected by the sensor is lower than the voltage (for example, 3 V) applied to a driving electrode formed on the electrolyte membrane. When the sensor is disposed close to the driving electrode, the sensor is easily influenced by a drive voltage. When the sensor is disposed apart from the driving electrode, the influence of the drive voltage on the sensor decreases but it is not desirable from the viewpoint of the decrease in size of the entire actuator.

SUMMARY

An advantage of some aspects of the invention is to easily control the displacement.

Another advantage of some aspects of the invention is that it provides an actuator having a sensor which is hardly influenced by a driving electrode.

Another advantage of some aspects of the invention is that it provides a small-sized actuator having a sensor which is hardly influenced by a driving electrode.

According to an aspect of the invention, there is provided an actuator including: a layer that contains an electrolyte and that is deformed with an application of an electric field thereto; and a first driving electrode and a second driving electrode that apply the electric field to the electrolyte, wherein the first driving electrode is supplied with a first drive voltage and the second driving electrode is supplied with a second drive voltage. Here, at least one of the first drive voltage and the second drive voltage is PWM-modulated and the amount of displacement of the layer containing the electrolyte is controlled on the basis of the degree of the PWM modulation.

Here, the electrolyte membrane is a membrane in which ions are transmitted well and has a nature that a positive electrode and a negative electrode interposing the electrolyte membrane therebetween are not electrically shorted. The invention is not limited to this electrolyte membrane, as long as ions in a membrane move (or are biased) with the application of a voltage to deform the membrane.

According to this configuration, it is possible to easily control the amount of displacement of the layer containing an electrolyte. Compared with the case where the actuator is controlled (driven) with a voltage level (analog), it is possible to perform the control with a smaller influence of noise by driving the actuator with a PWM signal having a large amplitude. Particularly, this configuration is suitable for a case where the actuator is driven by a small amount of displacement.

The actuator may further include a driving control circuit that supplies the first drive voltage and the second drive voltage. According to this configuration, the driving control circuit gets close to the driving electrodes, thereby reducing the power loss. The influence of noise is also reduced.

The first driving electrode may be disposed on a first surface of the layer containing the electrolyte, and the second driving electrode may be disposed on a second surface opposite to the first surface of the layer containing the electrolyte. According to this configuration, it is possible to form an electric field in the thickness direction of the layer containing the electrolyte.

The actuator may further include a sensor that is formed on the layer containing the electrolyte and that detects at least one of the direction of deformation and the amount of deformation of the layer containing the electrolyte. Here, the driving control circuit may apply a PWM drive voltage with a duty ratio corresponding to a difference between an instruction signal and the detection output of the sensor across the first driving electrode and the second driving electrode. According to this configuration, the change in bending of the actuator is feedback-controlled to correspond to the instruction signal.

The driving control circuit may supply the PWM drive voltage to the first or second driving electrode on the basis of the polarity of the difference between the instruction signal and the detection output of the sensor. According to this configuration, it is possible to control the curving (bending) direction of the actuator.

The sensor may be formed on the surface of the layer containing the electrolyte. According to this configuration, it is possible to simply add the sensor to the actuator. It is possible to reduce the size of an actuator structure.

The driving control circuit may periodically supply the PWM drive voltage to the first and second driving electrodes. In this case, one period of the PWM drive voltage may include a PWM driving period and a detecting period of the sensor, the duty ratio of the PWM drive voltage in the PWM driving period may be set, and the detection output may be output in the detecting period of the sensor. According to this configuration, the drive voltage of the actuator and the detection output of the sensor are separated in the time axis, thereby avoiding the crosstalk that the drive voltage having a relatively high level leaks into the detection output.

The connection between a driving output terminal of the driving control circuit and the first driving electrode and the connection between the driving output terminal and the second driving electrode may be broken in the detecting period of the sensor. According to this configuration, the driving electrodes and the driving control circuit of the actuator are separated from each other in the detecting period, thereby obtaining an accurate detection output from the sensor.

A driving output terminal of the driving control circuit may be set to a high-impedance state in the detecting period of the sensor. According to this configuration, it is possible to prevent a current from flowing in the driving control circuit from the driving electrodes of the actuator in the detecting period. Accordingly, it is possible to obtain the detection output from the sensor with higher accuracy.

The driving control circuit may be formed as an IC chip and the sensor may be formed as a sensor electrode or a piezoelectric device (voltage-detecting device), both of which may be disposed on the surface (as an upper layer) of the layer containing the electrolyte. According to this configuration, it is possible to reduce the total size of the actuator structure.

The above-mentioned configurations can be properly combined.

In the actuator according to an aspect of the invention, since the actuator is driven with a PWM voltage, it is possible to perform a control with a smaller influence of noise, compared with the case where the actuator is controlled with a voltage level. Particularly, the invention is more suitable for a case where the actuator behaves by a small amount of displacement. Since an electrical circuit chip such as a controller is mounted on the actuator (the electrolyte membrane), it is possible to construct a small-sized actuator structure.

BRIEF DESCRIPTION OF THE DRAWINGS

The invention will be described with reference to the accompanying drawings, wherein like numbers reference like elements.

FIGS. 10A and 10B are diagrams illustrating the comparison of a voltage level control and a PWM control.

DESCRIPTION OF EXEMPLARY EMBODIMENTS

An actuator according to an aspect of the invention employs an electrolyte membrane that is deformed with an application of an electric field, for example, an ion-conductive polymer electrolyte membrane. The reason for the deformation of the electrolyte membrane with the application of a voltage is not clearly found yet, but can be explained as follows.

When electrodes are formed on the front and back surfaces of an electrolyte membrane and a potential difference is caused between the electrodes on the front and back surfaces by the use of a DC power source, ions in the electrolyte membrane moves to the electrode corresponding to their polarity with the applied electric field. Since water molecules (solvent) move along with the ions, the positive electrode side and the negative electrode side of the electrolyte membrane are different in the amount of water (solvent) in the electrolyte membrane. The electrolyte membrane extends on the side where the amount of water in the electrolyte membrane increases, and the electrolyte membrane contracts on the side where the amount of water decreases. As a result, the electrolyte membrane is curved.

A membrane formed by gelating an ionic solution, such as a perfluorosulfonic acid membrane ("NAFION", which is a registered trademark of Du Pont Co., Inc.) or a perfluorocarboxylic acid membrane ("FLEMION", which is a registered trademark of Asahi Chemicals Co., Ltd.), can be used as the electrolyte membrane.

The electrolyte membrane has a characteristic that it is bent with the application of a voltage and it is restored to the original state with the stop of the voltage application.

The electrolyte membrane gives a rubber-like feeling and is soft when no voltage is applied thereto.

In the invention, attention is paid to the fact that a voltage (potential difference) is generated in the electrolyte membrane when a force (external stress) is externally applied to the electrolyte membrane. It is thought that this is because the water (solvent) is biased in the electrolyte membrane when the electrolyte membrane is curved and a difference in ion density is accordingly generated between the extending side and the contracting side of the electrolyte membrane. The generated voltage depends on the curving (the change in bending) of the electrolyte membrane.

This voltage is detected by the use of a sensor electrode layer and is signal-processed by an electrical circuit chip (control circuit) disposed on the electrolyte membrane. The detected voltage of the sensor electrode layer is lower in level (for example, 1/1500) than a drive voltage, but the signal deterioration can be minimized by processing the signal in the vicinity of the sensor electrode, thereby improving the S/N ratio.

First Embodiment

Hereinafter, an embodiment of the invention will be described with reference to the accompanying drawings.

Figure 1:
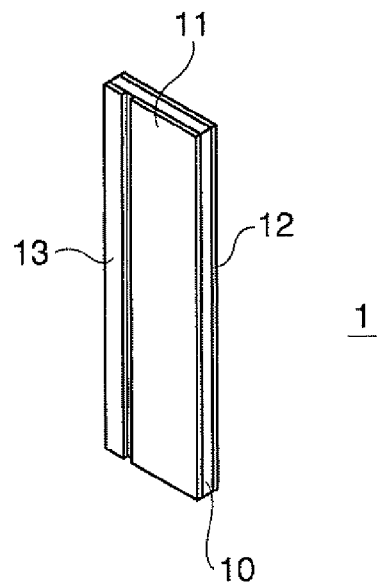
FIG. 1 is a perspective view illustrating an example of an actuator having a sensor electrode layer according to an embodiment of the invention.
Figure 2:
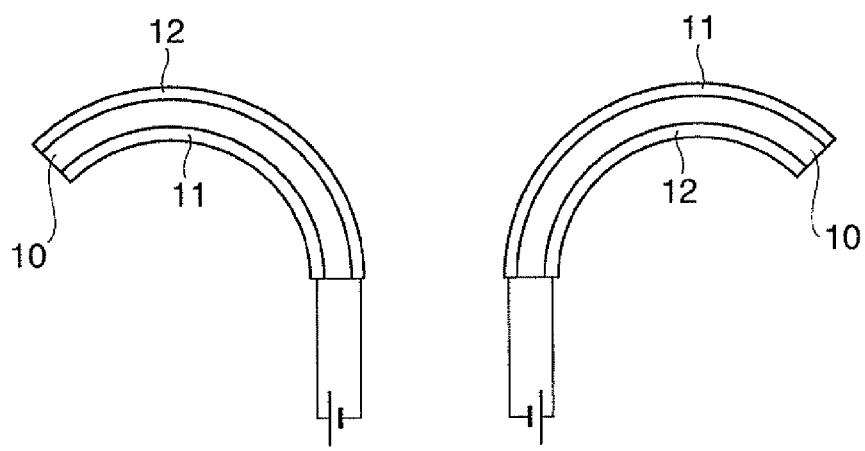
FIG. 2 is a diagram illustrating the operation of the actuator shown in FIG. 1.
Figure 3:
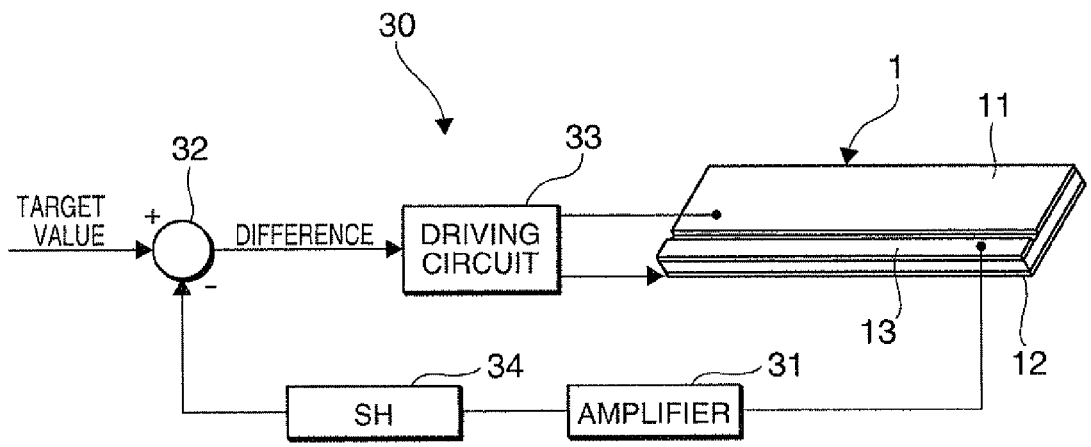
FIG. 3 is a block diagram illustrating a driving control system of the actuator.

FIGS. 1 to 3 are diagrams illustrating the operation of an actuator according to an embodiment of the invention. FIG. 1 is a perspective view schematically illustrating the actuator. FIG. 2 is a diagram illustrating the curving (bending) behavior of the actuator shown in FIG. 1. FIG. 3 is a circuit block diagram illustrating the configuration of a controller controlling the behavior of the actuator.

As shown in FIG. 1, the actuator 1 includes a drive electrode 11 (electrode A) and a sensor electrode 13 as a first driving electrode layer formed on one surface of an electrolyte membrane 10 and a driving electrode 12 (electrode 13) as a second driving electrode formed on the other surface. The drive electrode 11 and the sensor electrode 13 are separated from each other by a predetermined distance, for example, 0.5 to 1.0 mm, for the electrical isolation.

For example, a fluorine resin ion-exchange membrane can be used as the electrolyte membrane 10, but the electrolyte membrane is not limited to this example. A cation-exchange membrane and an anion-exchange membrane can both be used as the ion-exchange membrane. Examples of the cation-exchange membrane include a perfluorosulfonic acid membrane and a perfluorocarboxylic acid membrane.

The driving electrodes 11 and 12 and the sensor electrode 13 can be formed of gold, platinum, iridium, palladium, ruthenium, carbon nano tube, or the like, but are not limited to these materials. A chemical plating method, an electrical plating method, a vacuum deposition method, a sputtering method, a coating method, a pressure-bonding method, a welding method, or the like can be properly used for the bonding of the electrodes to the electrolyte membrane.

For example, in this embodiment, a perfluorosulfonic acid membrane ("NAFION", which is a registered trademark of Du Pont Co., Inc.) is used as the electrolyte membrane 10. For example, the electrolyte membrane has a rectangular shape with a short side of 2 cm, a long side of 5 cm, and a thickness of 200 μm to 1 mm. The sensor electrode 13 has a rectangular shape in which the length (width) in the short-side direction (for the electrolyte membrane 10) is 2 mm and the length in the long-side direction is 5 cm. The electrolyte membrane 10 or the actuator is not limited to this shape, but can have various shapes.

In this embodiment, the driving electrodes 11 and 12 and the sensor electrode 13 are formed by plating the electrolyte membrane 10 with gold. In plating the electrolyte membrane 10 with gold, the electrolyte membrane is infiltrated into an aqueous solution of gold dichlorophenanthroline chloride [Au(phen)Cl$_2$]Cl and gold complex ions are adsorbed thereto with an ion-exchange reaction. The resultant membrane is immersed in an aqueous solution of sodium sulfite (Na$_2$SO$_3$) and is reduced, and the gold ions in the membrane are precipitated externally. Accordingly, both surfaces of a membrane can be plated with gold. Regarding the amount of gold to be plated, the amount of gold to be plated by a single plating process is in the range of 1 to 2 mg/cm$^2$ on one surface. By repeating this process, a desired electrode thickness is obtained. For example, by repeating the plating process four to eight times, gold of about 10 mg/cm$^2$ on one surface is precipitated. In this case, the thickness of the gold layer (electrode layer) is in the range of 1 to 5 μm.

By cutting the gold electrode layer formed on one surface of the electrolyte membrane in a linear shape with a width of 0.5 to 1 mm necessary for the electrical isolation by the use of a laser beam, the driving electrode 11 and the sensor electrode 13 are separated from each other. The sensor electrode 13 extends in the length direction of the electrolyte membrane 10 and detects the potential difference (voltage) between the electrode layers 12 and 13 generated in the curved portion by the curving behavior of the actuator. The sensor electrode 13 may be formed on any of the front surface and the back surface of the electrolyte membrane 10.

FIG. 2 is a diagram illustrating the behavior of the actuator 1. In the drawing, the same parts as shown in FIG. 1 are referenced by the same reference numerals and are not described repeatedly.

As shown in the drawing, when a negative voltage and a positive voltage are applied to the driving electrode layers 11 and 12 of the actuator 1 from a DC source, respectively, anions in the electrolyte membrane 10 move to the driving electrode layer 12. Accordingly, the water on the side of the driving electrode layer 11 relatively decreases and the water on the side of the driving electrode layer 12 relatively increases, whereby the actuator 1 curves and bends to the left as shown in the left part of FIG. 2. Similarly, when a positive voltage and a negative voltage are applied to the driving electrode layers 11 and 12 from the DC source, respectively, the anions in the electrolyte membrane 10 move to the driving electrode layer 11. The water on the side of the driving electrode layer 12 relatively decreases and the water on the side of the driving electrode layer 11 relatively increases, whereby the actuator 1 curves and bends to the right as shown in the right part of FIG. 2.

FIG. 3 is a block diagram illustrating a control system (controller) 30 driving the actuator 1. The control system (controller) 30 can be constructed by an integrated circuit (IC) chip. The integrated circuit chip can be disposed on the actuator 1.

As shown in the drawing, the detected voltage of the sensor electrode 13 is amplified by an amplifier 31 and is input to the inverted input of a comparator (differential amplifier) 32. The comparator 32 is supplied with a voltage corresponding to the position of the actuator 1 at the present time. As described later, when the detected voltage of the sensor electrode 13 is intermittently detected, a sampling and holding circuit 34 operating with a gate signal G is preferably disposed between the amplifier 31 and the comparator 32. A target value of the amount of displacement of the actuator 1 is input as a voltage value to the normal input of the comparator 32. The comparator 32 outputs the difference between the voltage of the sensor electrode and the target value. A driving circuit 33 determines the direction of the displacement of the actuator 1 depending on the polarity (plus or minus) of the difference output and determines the polarity of the output voltage. The driving circuit 33 determines the amount of displacement of the actuator 1 depending on the absolute value of the difference output and sets the level of the output voltage.

The control system 30 can be constructed by a one-chip micro computer or a FPGA (Field Programmable Gate Array) and by the combination of software processes or functional blocks.

The output voltage of the driving circuit 33 is supplied to the driving electrodes 11 and 12 of the actuator 1. The actuator 1 curves (bends) in the direction corresponding to the polarity of the output voltage of the driving circuit 33 by the magnitude of curve (amount of bending) corresponding to the level of the output voltage. When the actuator 1 is curved by the driving electrodes 11 and 12, water in the area of the sensor electrode 13 moves in the electrolyte membrane 10 due to the curving to cause a difference in the ion density and thus the voltage of the sensor electrode 13 varies. This value is fed back to the comparator 32 and the difference from the target value is output as a deviation to perform a correction. By a feedback control loop repeating this process, the actuator 1 is displaced to a position corresponding to the set target value and is stabilized.

In this embodiment, at the time of performing a control as described above, a driving time of the actuator 1 by the driving electrodes and a detecting time by the sensor electrode are separated on the time axis so as not to overlap with each other. Accordingly, the supply of the drive voltage is stopped in the course of detecting the voltage by the sensor electrode, thereby avoiding the influence (crosstalk) of the drive voltage on the detected voltage.

Figure 4A:
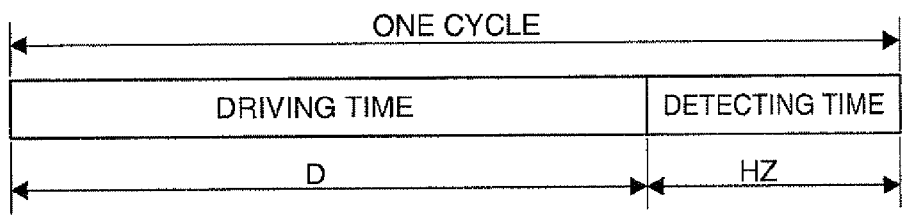
FIGS. 4A and 4B are diagrams illustrating a drive signal applied to a drive electrode of the actuator.
Figure 4B:
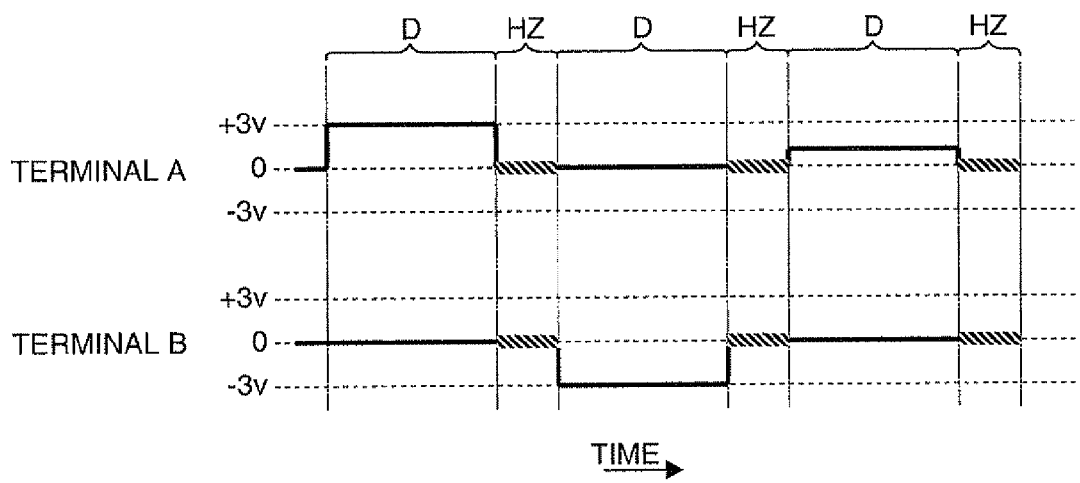

FIGS. 4A and 4B are timing diagrams illustrating drive signals for driving the actuator 1. FIG. 4A illustrates the configuration of the drive signal supplied to the driving electrodes 11 and 12 from the driving circuit 33. FIG. 4B illustrates the states of the output voltages (drive signals) output from output terminals A and B of the driving circuit 33.

As shown in FIG. 4A, the time axis of the drive signal includes a driving time (driving period) in which a voltage is applied to the actuator 1 and a detecting time (detecting period) in which the output is stopped at the time of reading the output voltage from the sensor electrode 13. The voltage level (analog) in the driving period corresponds to the magnitude of curve by which the actuator 1 is curved. In the detecting time, the output terminal of the driving circuit 33 is set to a high-impedance state HiZ and the driving circuit 33 does not have an influence on the detection output of the sensor electrode 13.

One cycle of control is set by the combination with the detecting time.

The order of the driving time and the detecting time in one cycle is not particularly limited. When the ratio of the detecting time in one cycle is set to be extremely small, the driving efficiency is more excellent. The time of one cycle may be changed.

As described above, by separating the period in which the drive voltage is applied to the actuator 1 and the detecting period in the time axis so as not to overlap with each other, it is possible to avoid the crosstalk of the driving electrodes with the sensor electrode.

Figure 5:
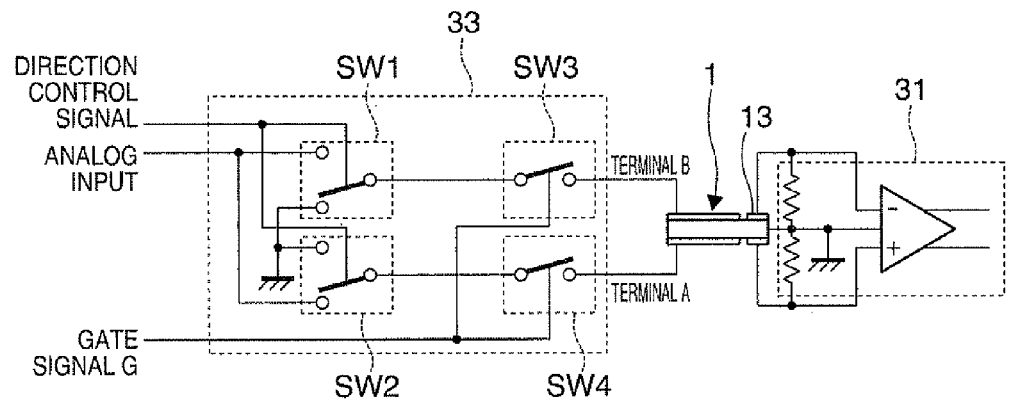
FIG. 5 is a diagram illustrating a circuit configuration (balanced circuit) of a driving circuit.

FIG. 5 shows the configuration (a part) in which the sensor electrode 13, the amplifier 31, and the driving circuit 33 constitute a balanced circuit. In the drawing, a direction control signal and an analog signal supplied to the driving circuit 33 correspond to the polarity of the deviation of the output of the comparator 32 shown in FIG. 3 and the absolute value (drive voltage) of the deviation. By the use of the direction control signal, the switching of switches 1 and 2 is controlled and the polarity of the analog signal is set. The gate signal G controls the switching of switches 3 and 4 to correspond to the driving time and the detecting time so as to supply the analog signal (drive voltage) to the driving electrodes 11 and 12 of the actuator 1 from terminal A and terminal B. Each switch is made up of a transistor. The sensor electrode 13 disposed in the actuator 1 is made up of two opposite electrodes and generates a balanced output. The detection output is amplified by the amplifier 3 including a differential amplifier and is supplied to the comparator 32.

The level holding time of the sampling and holding circuit 34 can be set by the use of the gate signal G.

Figure 6:
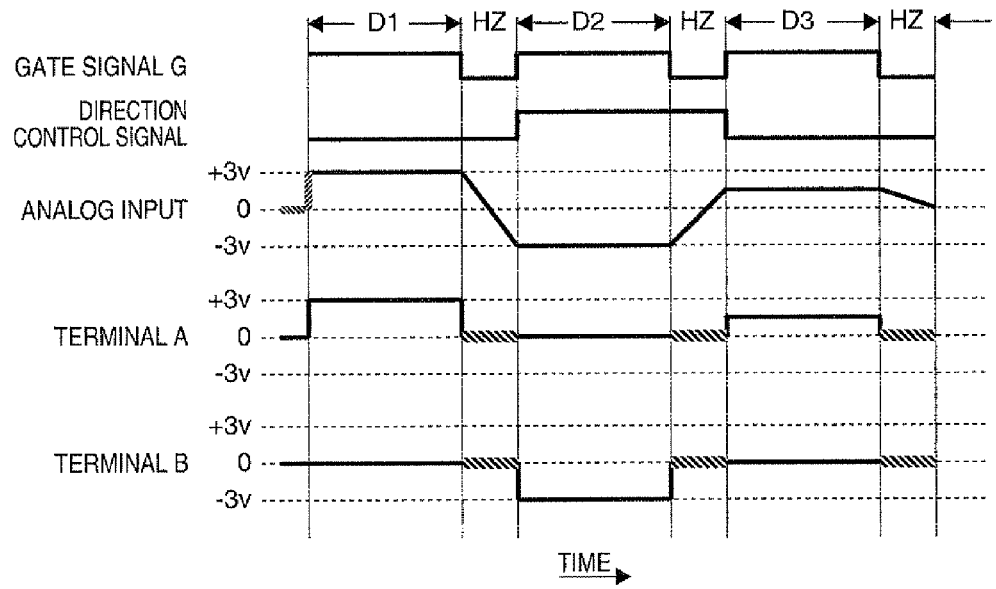
FIG. 6 is a timing diagram illustrating input and output signals of the driving circuit shown in FIG. 5.

FIG. 6 is a timing diagram illustrating the signals in the driving circuit shown in FIG. 5. In the example shown in the drawing, in period D1 (driving period) of the gate signal, switches 2 and 4 are turned on to be supplied with a drive voltage (analog input) of 3 V from the outside. Since the direction control signal is at the low level, switches 1 and 2 are selectively set as shown in the drawing, 3 V is output from output terminal A, and 0 V is output from output terminal B. Thereafter, the gate signal enters the detecting period HZ, switches 3 and 4 are turned off, output terminal A and output terminal B are changed to a high-impedance state. In the detecting period HZ, the output voltage of the sensor electrode is detected and is fed back to the analog input. Since the sampling and holding circuit 34 is used, the detected value can be held until the next detecting. Accordingly, it is possible to perform a feedback control even with intermittent sampling.

In subsequent period D2 of the gate signal, switches and 4 are turned on to be supplied with the drive voltage (analog input) of −3 V from the outside. Since the direction control signal is at the high level, switches 1 and 2 are selectively set oppositely to the state shown in the drawing, 0 V is output from output terminal A, and −3 V is output from output terminal B. Thereafter, the gate signal enters the detecting period HZ, switches 3 and 4 are turned off, output terminal A and output terminal B are changed to a high-impedance state. In the detecting period HZ, the output voltage of the sensor electrode is detected and is fed back to the analog input.

The same is true of the subsequent period D3 and the others of the gate signal.

Figure 7:
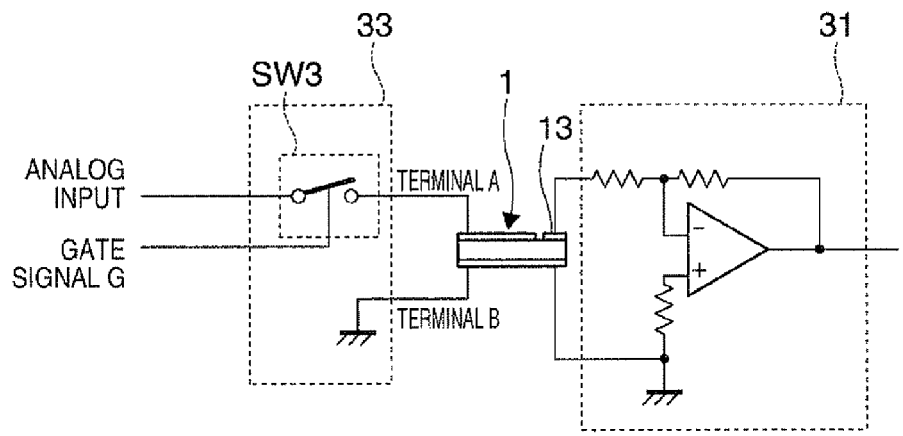
FIG. 7 is a diagram illustrating another circuit configuration (unbalanced circuit) of the driving circuit.

FIG. 7 shows the configuration (a part) in which the sensor electrode 13, the amplifier 31, and the driving circuit 33 constitute an unbalanced circuit. Since the circuits share the ground potential, the circuit configuration is simpler than that of the balanced circuit (FIG. 5).

Figure 8:
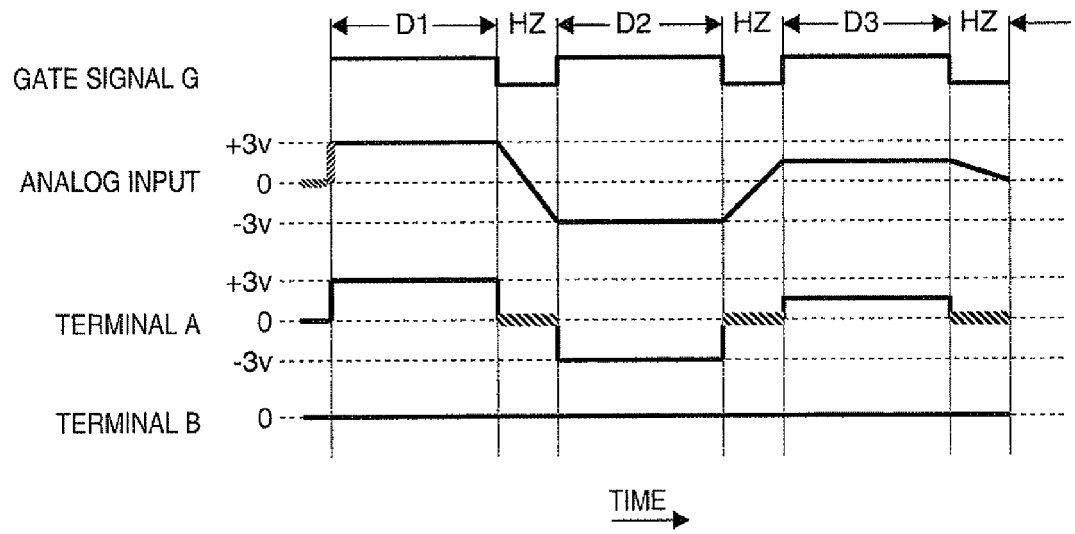
FIG. 8 is a timing diagram illustrating input and output signals of the driving circuit shown in FIG. 7.

FIG. 8 is a timing diagram illustrating the signals in the driving circuit shown in FIG. 7. By employing the unbalanced circuit configuration, output terminal B has the ground potential. The drive voltages obtained from the output terminal A and output terminal B are the same as shown in FIG. 6.

As described above, when the sensor is directly mounted on the actuator, the crosstalk from the driving electrode causes a problem. However, in this embodiment, the driving time and the detecting time are separated, whereby the crosstalk is avoided and the detecting is thus performed well. By applying the feedback control to the actuator having a sensor, it is possible to construct a smaller-sized structure.

Second Embodiment

The PWM (Pulse Width Modulation) control will be described below.

Figure 9:
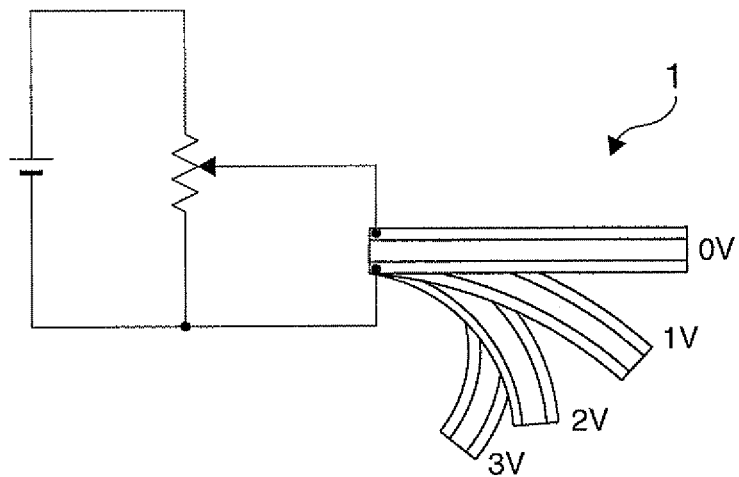
FIG. 9 is a diagram illustrating a voltage applied to the actuator and an amount of displacement of the actuator.

As shown in FIG. 9, the magnitude of curve (the amount of displacement) of the actuator 1 varies depending on the level of the voltage applied to the driving electrodes. In the drawing, the variation of the actuator 1 when the applied voltage varies in the range of 0 to 3 V is schematically illustrated.

FIGS. 10A and 10B are diagrams illustrating the replacement of the level control (analog driving) of the drive voltage of the actuator 1 with the PWM control (pulse-voltage application time ratio control) of the drive voltage.

FIG. 10A shows an example of a graph illustrating the relation between the duty ratio of a pulse voltage of, for example, 3 V and the amount of displacement of the actuator. Here, the duty ratio is a ratio of the H-level time t of a pulse to one cycle time T of the pulse and is expressed by duty=(t/T)×100%. By controlling the duty ratio of the pulse voltage (drive voltage), it is possible to control the curve (displacement) of the actuator.

FIG. 10B shows an example of a graph illustrating the relation between the level of a voltage applied to the actuator and the amount of displacement of the actuator. It can be seen from both drawings that the drive voltage level control (analog driving) can be replaced with the drive voltage PWM control by performing the PWM driving control providing the same amount of displacement as the amount of displacement in the analog driving.

For example, when it is intended to set the amount of displacement of the actuator to 50%, a voltage of 1.5 V is applied in the level control (see FIG. 10B), but a drive voltage pulse with a duty ratio of 50% is applied in the PWM control.

Figure 11A:
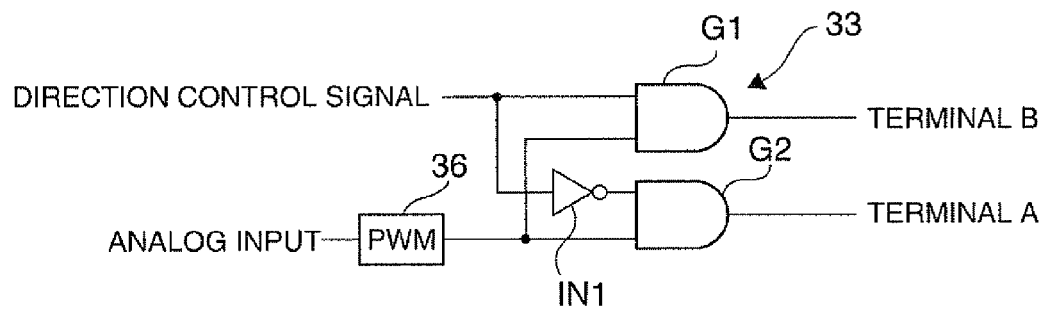
FIGS. 11A and 11B are diagrams illustrating another circuit configuration (PWM voltage driving) of the driving circuit.
Figure 11B:
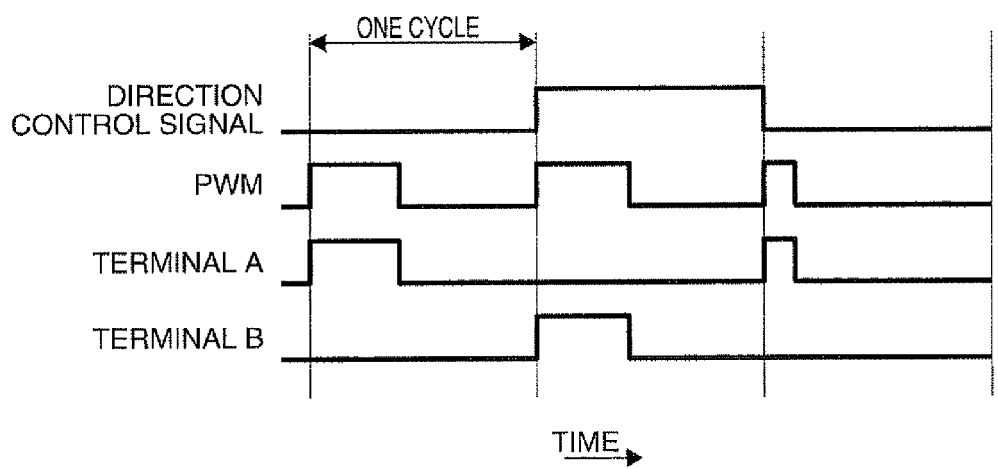

FIGS. 11A and 11B illustrate the configuration in which the driving circuit 33 is constructed by a PWM driving circuit. A PWM signal into which the analog input is converted by a PWM modulation circuit 36 and a direction control signal for setting the direction of curve of the actuator 1 are input to the PWM driving circuit.

As shown in FIG. 11A, the PWM driving circuit includes two-input AND gates G1 and G2 and an inverter IN1. The direction control signal is input to one input terminal of the AND gate G1, the PWM signal is input to the other input terminal, and the output terminal thereof is connected to output terminal B. The direction control signal is supplied to one input terminal of the AND gate G2 via the inverter IN1, the PWM signal is input to the other input terminal, and the output terminal thereof is connected to output terminal A.

As shown in FIG. 11B, when the direction control signal is at the L level, the PWM driving circuit outputs the PWM signal to output terminal A. When the direction control signal is at the H level, the PWM driving circuit outputs the PWM signal to output terminal B. In the actuator 1, the curve direction is determined depending on the electrode supplied with the PWM signal and the magnitude of curve (amount of displacement) is set depending on the duty ratio of the PWM signal.

For example, in case of the voltage level control, when the applied voltage varies by 0.5 V, the amount of displacement of 16.6 percentage is generated in the actuator. This is a great error factor when a fine control is performed. In the voltage level control, when the applied voltage is low, the response of the electrolyte membrane is slow and the voltage is close to a noise voltage, whereby it can be easily influenced by noise. On the contrary, in case of the PWM driving control, since the amplitude is constant at the H level and the time axis of the PWM is stabilized by a (quartz crystal) oscillator with high precision, it is hardly influenced by noise.

When a H-level signal is applied to the electrolyte membrane for a short time, the electrolyte membrane less deteriorates, compared with the case where a low-level voltage is applied to the electrolyte membrane for a long time by the use of the voltage level control.

In this way, the digital driving (PWM control) causes a less influence of noise than the analog driving (level control). In this case, the amount of displacement can be controlled finely, which is excellent.

Third Embodiment

It is preferable that the driving time and the detecting time are separated in the PWM driving control (see FIGS. 4A and 4B). Accordingly, the supply of the drive voltage is stopped in the course of detecting the voltage generated in the sensor electrode, thereby avoiding the influence (crosstalk) of the driving voltage pulse on the detected voltage.

Figure 12A:
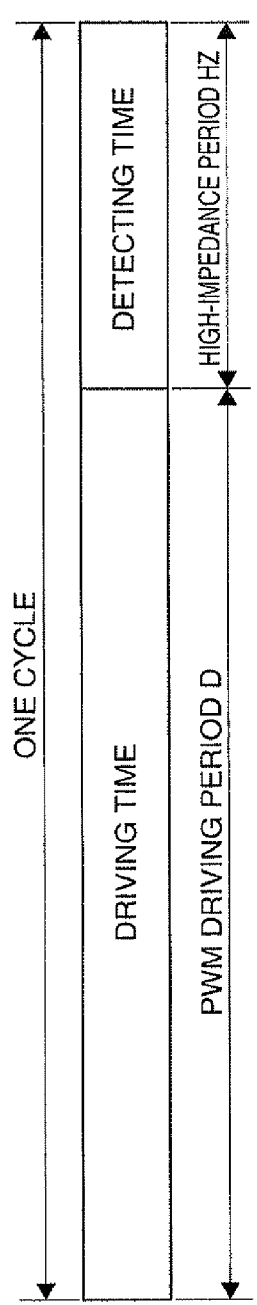
FIGS. 12A and 12B are diagrams illustrating the separation of a driving time and a detecting time when the PWM driving control is performed.
Figure 12B:
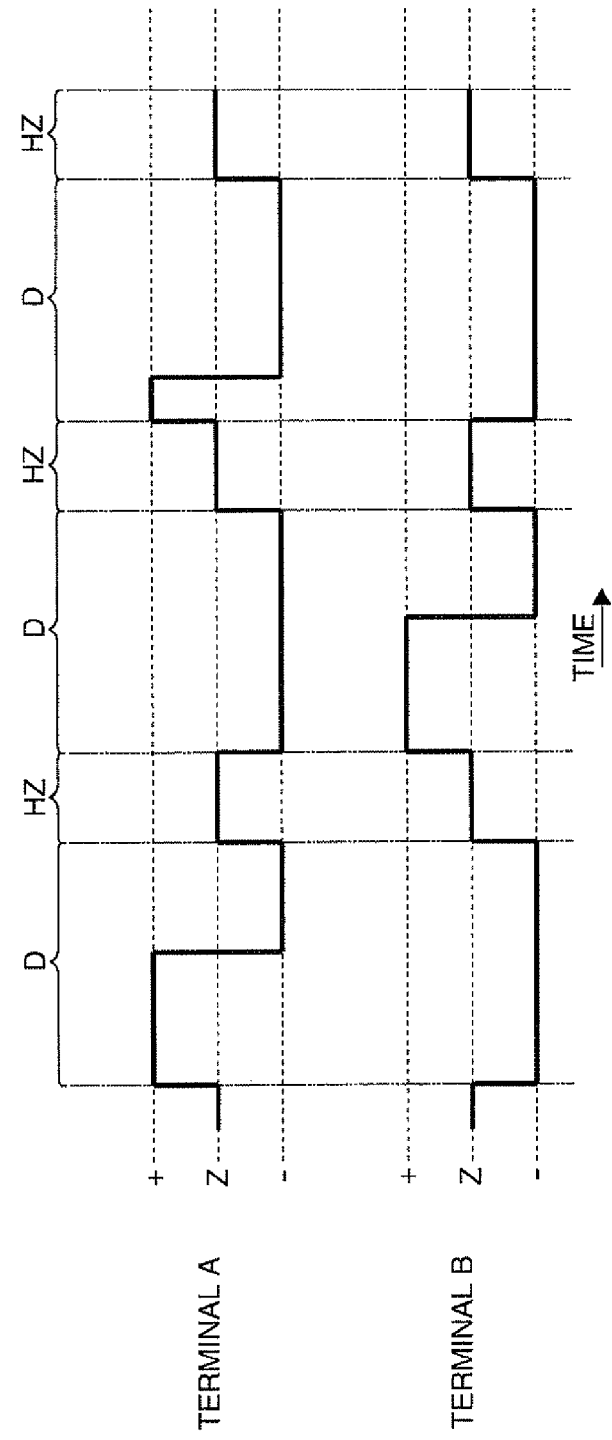

FIGS. 12A and 12B are timing diagrams illustrating the drive signal for driving the actuator 1. FIG. 12A illustrates the configuration of the drive signal supplied to the driving electrodes 11 and 12 from the PWM driving circuit 33. FIG. 12B illustrates the state of the output voltage (PWM drive signal) output from output terminals A and B of the driving circuit 33. In the drawing, "+" represents the amplitude (or the H level) of the positive voltage pulse, "−" represents the amplitude (or the L level) of the negative voltage pulse, and "Z" represents the high impedance state of the output terminal.

As shown in FIG. 12A, the time axis of the drive signal includes a driving time (PWM driving period D) in which a voltage is applied to the actuator 1 and a detecting time (corresponding to the high impedance period HZ) in which the output is stopped at the time of reading the output voltage from the sensor electrode 13. In the voltage pulse width (duty ratio) in the driving period corresponds to the magnitude of the curve of the actuator 1. As described above, the output terminal of the driving circuit 33 is set to the high impedance state HiZ in the detecting period and thus the driving circuit 33 does not influence the detection output of the sensor electrode 13.

In this embodiment, one cycle of control is set by the combination of the driving time and the detecting time. The order of the driving time and the detecting time in one cycle is not particularly limited. When the ratio of the detecting time in one cycle is set to be extremely small, the driving efficiency is more excellent. The time of one cycle may be changed.

As described above, by separating the period in which the drive voltage is applied to the actuator 1 and the detecting period in the time axis so as not to overlap with each other, it is possible to avoid the crosstalk of the driving electrodes with the sensor electrode.

Figure 13A:
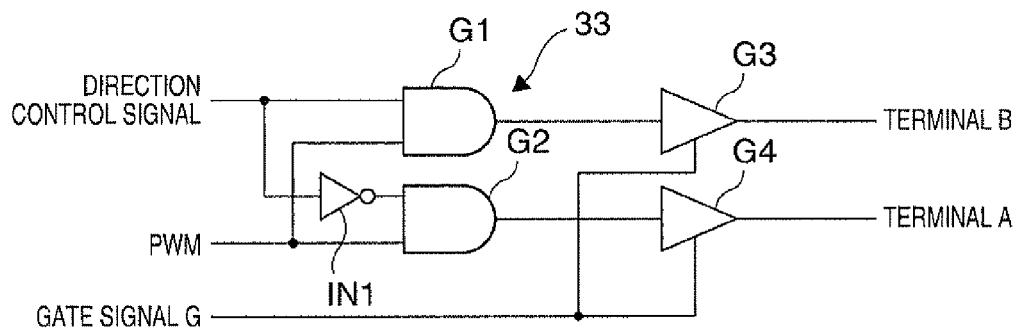
FIGS. 13A and 13B are diagrams illustrating the circuit configuration of the driving circuit operating by the combination of the PWM driving control and the separation of the PWM driving time and the detecting time.

As shown in FIG. 13A, the PWM driving circuit 33 includes two-input AND gate G1 and G2, an inverter IN1, and three-state gates G3 and G4. The three-state gate has three operation modes of the H level, the L level, and the high impedance. The direction control signal is supplied to one input terminal of the AND gate G1, the PWM signal is input to the other input terminal, and the output terminal thereof is connected to output terminal B via the gate G3.

The direction control signal is supplied to one input terminal of the AND gate G2 via the inverter IN1, the PWM signal is input to the other input terminal, and the output terminal thereof is connected to output terminal A via the gate G4.

The gates G3 and G4 are supplied with the gate signal G. The gate signal serves to block the relay of the PWM signal to the output terminal to set output terminals A and B to the high impedance state in the detecting period. Accordingly, the flowing of a current into the driving circuit 33 from the sensor electrode 13 is prevented, thereby improving the detection precision of the sensor.

Figure 13B:
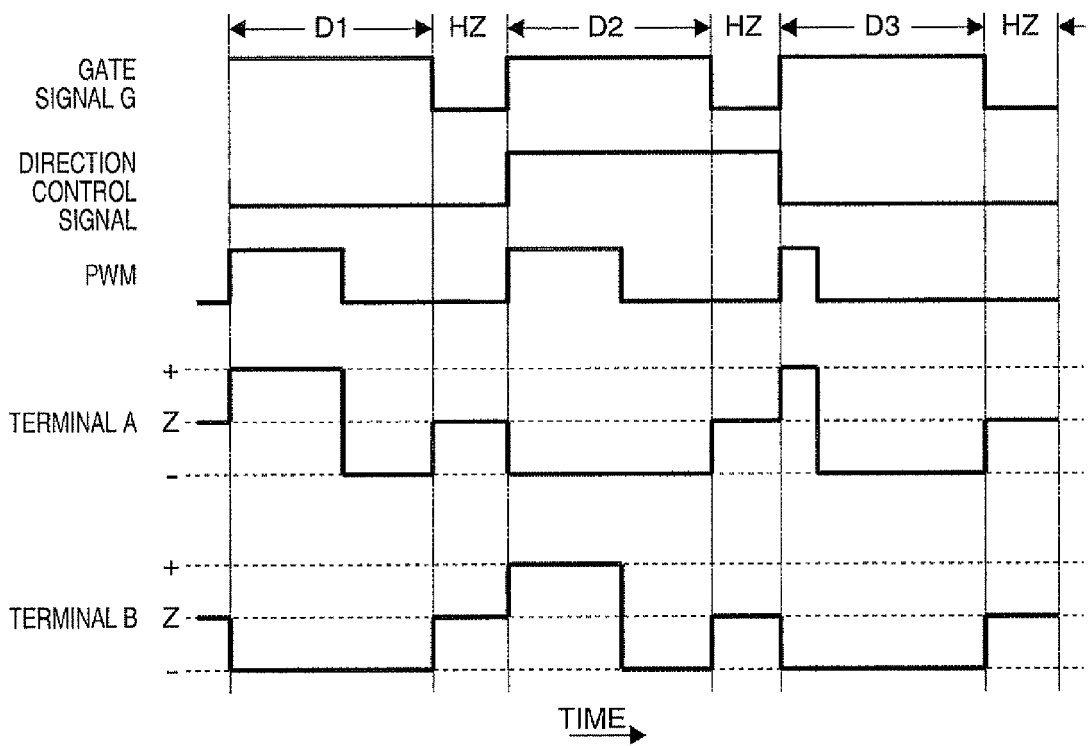

FIG. 13B is a timing diagram illustrating the signals in the PWM driving circuit 33. In the drawing, the levels of the output terminals A and B are represented by the output states (the H level is indicated by "+", the L level is indicated by "−", and the high impedance is indicated by "Z") of the three-state gates G3 and G4 in the last stage. In the example shown in the drawing, the gates G3 and G4 are turned on to supply the output of the gates G1 and G2 to the output terminals in period D1 (driving period) of the gate signal G. When the direction control signal is at the low level, the gate G1 is turned off and the gate G2 is turned on. The PWM signal is output to output terminal A and—level (for example, 0 V) is output to output terminal B. Thereafter, the gate signal enters the detecting period HZ, the output terminals of the gates G3 and G4 are changed to the high-impedance state, and output terminal A and output terminal B are changed to the high-impedance state. In the detecting period HZ, the output voltage of the sensor electrode is detected and is fed back to the PWM signal.

In subsequent period D2 of the gate signal G, the gates G3 and G4 are turned on and are supplied with the PWM signal. Since the direction control signal is at the high level, the gate G1 is turned on and the gate G2 is turned off. Output terminal A is set to − level and the PWM signal is output to output terminal B. Thereafter, the gate signal enters the detecting period HZ, the gates G3 and G4 are opened to set output terminal A and output terminal B to the high-impedance state. In the detecting period HZ, the output voltage of the sensor electrode is detected and is fed back to the analog input. The same control is performed in subsequent period D3 and the like of the gate signal.

By constructing the three-state gates G3 and G4 in the next stage so as to output three states of +3 V output (H), −3 V output (L), and high impedance (Z), a balanced circuit configuration is implemented and thus the polarities of the voltages applied to two driving electrodes can be inverted.

The actuator can be preferably used for artificial muscles of a robot and the like. The actuator can be used for systems automatically blocking light such as a blind (light-blocking curtain), an artificial iris, and an iris diaphragm mechanism of a camera by combination with an optical sensor.

As described above, according to this embodiment of the invention, since the supply time (period) of the drive voltage to the driving electrodes and the detecting time (period) are separated, it is possible to reduce the crosstalk which is a problem when a sensor is mounted on a polymer actuator. It is possible to implement a feedback control system employing an actuator reduced in size due to the mounting of the sensor.

By using the PWM drive signal as the drive voltage of the driving electrodes of the actuator, it is possible to implement a feedback control system which operates at a low level of the drive signal and is resistant to noise.

By implementing the electrical circuit of the feedback control system by the use of an IC chip and mounting the IC chip on the actuator, it is possible to reduce the size of the actuator structure.

In the above-mentioned embodiments, the sensor electrode extends in one direction and generates one output corresponding to the curving (bending) of the actuator in the direction, but the invention is not limited to this configuration.

The same advantages can be obtained even when a piezoelectric device being formed of PZT and generating a voltage corresponding to an applied pressure or resistance-variable device such as a strain gauge is formed on the electrolyte membrane instead of the sensor electrode.

What is claimed is:

1. An actuator comprising:
 a layer that contains an electrolyte, and that is deformed with an application of an electric field thereto;
 a first driving electrode and a second driving electrode that apply the electric field to the electrolyte; and
 a driving control circuit that supplies a first drive voltage and a second drive voltage,
 the first driving electrode being supplied with the first drive voltage and the second driving electrode being supplied with the second drive voltage,
 at least one of the first drive voltage and the second drive voltage is a periodic PWM-modulated voltage, the PWM-modulated voltage having a predetermined period including (i) a PWM driving period, and (ii) a detecting period wherein the output of the driving control circuit is in a low-voltage high-impedance state, and the driving control circuit inversely adjusts a ratio of a length of the detecting period to a length of the PWM driving period in the predetermined period.

2. The actuator according to claim 1, wherein the first driving electrode is disposed on a first surface of the layer containing the electrolyte, and
 wherein the second driving electrode is disposed on a second surface opposite to the first surface of the layer containing the electrolyte.

3. The actuator according to claim 1, further comprising a sensor that is formed on the layer containing the electrolyte and that detects at least one of a direction of deformation and an amount of deformation of the layer containing the electrolyte,
 wherein the driving control circuit applies a PWM drive voltage with a duty ratio corresponding to a difference between an instruction signal and a detection output of the sensor across the first driving electrode and the second driving electrode.

4. The actuator according to claim 3, wherein the driving control circuit supplies the PWM drive voltage to the first or second driving electrode on the basis of the polarity of the difference between the instruction signal and the detection output of the sensor.

5. The actuator according to claim 3, wherein the sensor is formed on the surface of the layer containing the electrolyte.

6. The actuator according to claim 3, wherein the driving control circuit periodically supplies the PWM drive voltage to the first and second driving electrodes,
 wherein one period of the PWM drive voltage includes the PWM driving period and the detecting period of the sensor,
 wherein the duty ratio of the PWM drive voltage in the PWM driving period is set, and
 wherein the detection output is output in the detecting period of the sensor.

7. The actuator according to claim 6, wherein the connection between a driving output terminal of the driving control circuit and the first driving electrode and the connection between the driving output terminal and the second driving electrode are broken in the detecting period of the sensor.

8. The actuator according to claim 6, wherein a driving output terminal of the driving control circuit is set to a high-impedance state in the detecting period of the sensor.

* * * * *